United States Patent [19]

Haraguchi

[11] 4,427,277
[45] Jan. 24, 1984

[54] STRUCTURE FOR MOUNTING COVER FOR AUTOMATIC FOCUS DETECTING DEVICE

[75] Inventor: Keisuke Haraguchi, Ranzan, Japan

[73] Assignee: Asahi Kogaku Kogyo Kabushiki Kaisha, Tokyo, Japan

[21] Appl. No.: 300,865

[22] Filed: Sep. 10, 1981

[30] Foreign Application Priority Data

Sep. 10, 1980 [JP] Japan .......................... 55-128626[U]

[51] Int. Cl.³ .............................................. G03B 3/00
[52] U.S. Cl. .................................... 354/402; 354/476
[58] Field of Search ................ 354/25, 31, 152, 23 R, 354/59, 56

[56] References Cited

U.S. PATENT DOCUMENTS

| | | | |
|---|---|---|---|
| 4,170,410 | 10/1979 | Sekida et al. | 354/59 X |
| 4,314,747 | 2/1982 | Haraguchi et al. | 354/59 X |
| 4,348,088 | 9/1982 | Yamamichi et al. | 354/152 |

Primary Examiner—Michael L. Gellner
Attorney, Agent, or Firm—Sughrue, Mion, Zinn, Macpeak and Seas

[57] ABSTRACT

A single-lens reflex camera is provided with a cover member having an aperture therein for limiting the light incident to an automatic focus detecting element. A light intercepting member is movable in conjunction with the raising of the mirror to block the opening to prevent unwanted reflections from the focus detecting element to the film surface, and the lower surface of the light intercepting member may carry a soft material of felt or the like for cleaning the upper surface of the focus detecting element during movement of the light intercepting member. The focus detecting element is elastically and adjustably mounted underneath the cover, and adjustment of the position of the focus detecting element can be accomplished through the lens mount opening after removal of the cover through the lens mount opening.

12 Claims, 6 Drawing Figures

STRUCTURE FOR MOUNTING COVER FOR AUTOMATIC FOCUS DETECTING DEVICE

BACKGROUND OF THE INVENTION

This invention relates to a structure for mounting a cover for an automatic focus detecting device using an automatic focus detecting element such as a self-running type photo-electric element (hereinafter referred to as "an image sensor", when applicable) in a single-lens reflex camera.

First, one example of a focus detecting principle, i.e. a so-called "contrast method" will be described. The optical image of an object to be photographed, which is formed by a photographing lens, has a maximum difference between the light and shade portions thereof, i.e. the image has a maximum contrast, when the lens is focused on the object. This phenomenon is due to the fact that the power spectrum of the spatial frequencies of the object becomes maximum at the time of focusing. A variety of devices for detecting a focusing position by utilization of this phenomenon have been proposed in the art. One example of the automatic focus detecting element in the automatic focus detecting deivce utilizing the contrast of an object to be photographed is a device in which an image sensor is used to electrically scan the power spectral distribution of an object's image into a time-series signal, and the time-series signal is electrically processed to obtain the contrast data of the object's image dynamically.

The image sensor is constituted by a plurality of minute photoelectric elements and a scanning circuit, and image sensors may be either MOS-FET type or CCD type, both of which are commercially available, depending on the types of scanning circuits employed.

An automatic focus detecting device using an image sensor can be provided merely by using a simple mechanism comprising an image sensor and an electrical circuit, with the image sensor set at a position equivalent to the film surface. Therefore, an automatic focus detecting device utilizing an image sensor is advantageous in that it is considerably compact. In arranging the automatic focus detecting device using an image sensor, a light beam forming the image of an object must be introduced to the finder system and the focus detection system simultaneously. For this purpose, for instance, a method is employed in which the light beam is split into two parts by a half mirror and a total reflection mirror so that one of the two parts is used to form the object's image on the focusing screen in the finder system and the other is used to form the object's image on the image sensor in the focus detection system. Such an arrangement is shown, for example, in U.S. Pat. No. 4,180,309.

In this type of device, it is necessary that the mirrors mentioned above are retracted from the optical path of the photographing image to prevent vignetting on the film surface during the photographing operation. Steps should also be taken to prevent the occurrence of ghosts on the film surface due to unwanted reflection from the focusing screen in the finder system and from the protective plate such as a glass plate of the image sensor in the focus detection system. It is well known in the art that, in the case of the focusing screen, the mirror holding frame is lifted at the photographing time to cover the focusing screen to thereby prevent the reflection from the focusing screen and to prevent the leakage of light from the finder side to the film surface. It goes without saying that the unwanted reflection from the protective plate of the image sensor must also be prevented since it is also harmful to photographing as was described above.

On the other hand, if the image of an object on the focusing screen in the finder system is not completely coincident with that on the image finder in the focus detection system, then the automatic focus detecting device cannot be used. Therefore, focus matching is needed for the finder system and the focus detection system, and it is desirable that the focus matching can be readily achieved even after the camera has been assembled. Further, if dust or the like is stuck onto the protective plate of the image sensor, it may cause some light blockage and, accordingly, the sensor cannot operate satisfactorily. Thus, it is also necessary to keep the surface of the protective plate of the sensor clean at all times.

SUMMARY OF THE INVENTION

It is therefore an object of the present invention to provide a device for covering the image sensor during the photographing operation to prevent unwanted reflections from the image sensor cover.

It is a further object of this invention to provide such a covering device which will also protect and clean the image sensor cover plate.

It is a still further object of this invention to provide such a covering device which will also permit adjustment of the focus detection system after the camera has been assembled.

In view of the foregoing this invention provides a structure for mounting a sensor cover for an automatic focus detecting device using an automatic focus detecting element such as an image sensor, in which the sensor cover is provided with a light intercepting member adapted to prevent an irregular reflection from the surface of the sensor and to remove dust or the like from the surface of the sensor. The light intercepting member is movable in synchronism with mirror movement. The sensor cover can be mounted through the opening of the body mount, and the sensor can be adjusted for focusing after the sensor cover has been removed through the opening of the body mount.

BRIEF DESCRIPTION OF THE DRAWINGS

One embodiment of this invention will now be described with reference to the accompanying drawings, in which.

DETAILED DESCRIPTION OF THE PREFERRED EMBODIMENT

Figure 1:
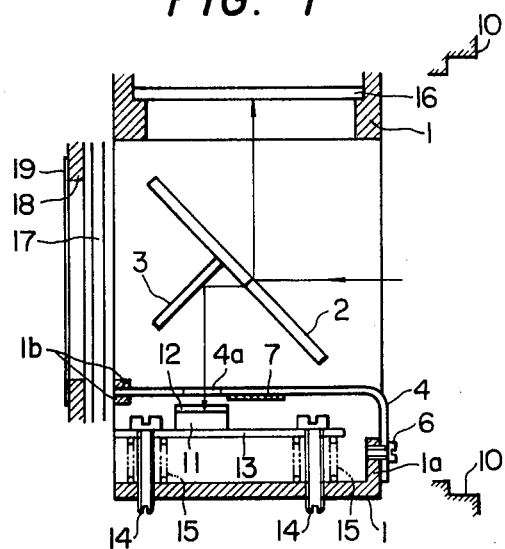
FIG. 1 is a sectional view of a mirror box and its relevant components, incorporating the sensor cover according to the present invention, prior to the photographing operation.

In the figures, reference numeral 1 designates a mirror box body; 2, a mirror in which the central portion along the optical axis is a half mirror and the remaining portion is a total reflection mirror (hereinafter referred to as "a first mirror 2", when applicable); 3, a total reflection mirror (hereinafter referred to as "a second mirror 3", when applicable); 4, a sensor cover having an opening 4a for preventing the incidence of unwanted light to a sensor, having two end portions 4c inserted into a groove 1b cut in the mirror box, and having a bent portion with a hole 4b at its center, the sensor cover 4 being fixedly secured to an upright portion 1a of the mirror box by a screw 6 inserted into the held 4b; 7, a light intercepting member rotatably mounted on a shaft 8 embedded in the sensor cover 4, the light intercepting member 7 having one end portion 7a which is in the form of a sector to cover the opening 4a of the sensor cover 4, and the other end 7b in which a pin 9 is embedded, the end portion of the pin 9 being coupled to an elongated hole 20b cut in a mirror up lever 20 (described later); 10, a body mount; and 13, a sensor substrate on which an image sensor and a sensor protecting glass plate 12 are provided. Three adjusting screws 14 are inserted into the respective holes in the sensor substrate 13 and screwed into the mirror box body 1 through compression springs 15 disposed between the sensor substrate 13 and the mirror box body 1, so that the heads 14a of the screws 14 limit the upward displacement of the sensor substrate 13 and the latter 13 is elastically supported by the compression springs 15. Each of the adjusting screws has grooves 14b and 14c cut respectively in the top and the bottom, to adjust the vertical displacement of the sensor substrate 13.

Further in the figures, reference numeral 16 designates a focusing screen; 17, a shutter; 18, the aperture of the camera body; 19, a film; 20, the mirror up lever mentioned before which is pivotally mounted on a shaft 22 embedded in the mirror box body 1; and 21, a mirror restoring lever rotatably mounted on a shaft 22. The mirror up lever 20 has a downwardly bent end portion 20a abutted against a mirror operating lever 31 and the aforementioned elongated hole 20b into which is fitted the pin 9 embedded in the light intercepting member 7. The mirror restoring lever 21 has one end portion 21b in which a roller 23 is embedded, the roller 23 abutting against a mirror charging member (not shown) during the mirror charging operation. The lever 21 further has a heat portion 21c which is engaged with a step 29a of a locking lever 29 when a mirror drive spring has charged, and a downwardly bent end portion 21a abutted against the mirror operation lever 31. A pin 28 is embedded in another end portion 21d of the mirror restoring lever 21, and a mirror restoring spring 5 is connected between the pin 28 and a pin 27 embedded in the mirror box body 1. A mirror lifting spring 25 is elastically disposed between a pin 24 embedded in one end portion 20c of the mirror up lever 20 and a pin 26 embedded in one end portion 21b of the mirror restoring lever 21, and is coupled to the shaft 22. The locking lever 29 is pivotally mounted on a shaft 30 and is urged counterclockwise by a spring (not shown). The locking lever 29 has the step 29a and also has a bent portion 29b which is engaged with a shutter bottom curtain cooperating member 32.

The operation of the embodiment thus constructed will now be described.

Figure 2:
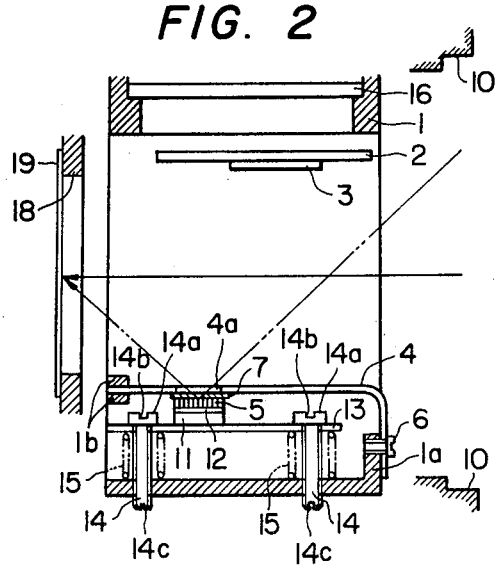
FIG. 2 is a view similar to FIG. 1 after the mirror has been raised for the photographing operation.
Figure 4:
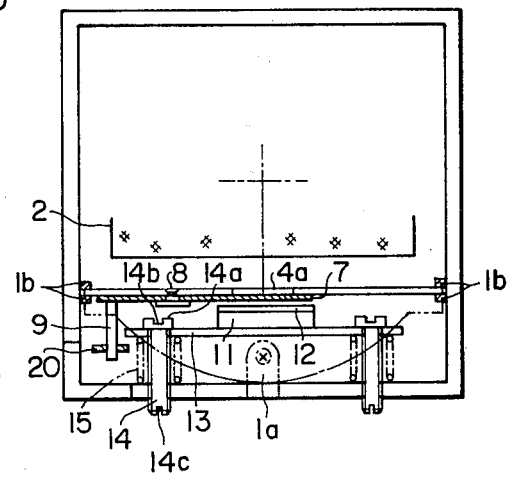
FIG. 4 is a front view of the mirror box mechanism of FIG. 1.

FIG. 1 shows a state of the embodiment before photographing, in which a light beam is introduced onto the image sensor 11 by the first and second mirrors and the automatic focus detecting device is operated. The light intercepting member 7 does not block the opening 4a of the sensor cover 4 in this state. FIG. 2 shows a state of the embodiment during photographing in which the first and second mirrors have been lifted and the shutter 17 opened to allow the light beam to fall on the film. In this state, the sensor cover's opening 4a is closed to prevent an irregular reflection (as indicated by the two-dot chain line) due to the sensor-protecting glass plate 12.

Figure 5:
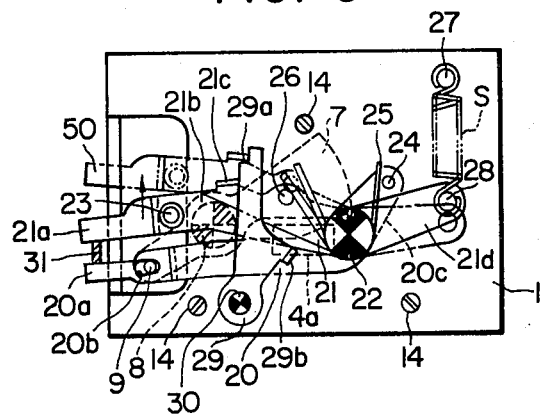
FIG. 5 is a bottom view of the mirror box mechanism in the pre-photographing condition shown in FIG. 1.
Figure 6:
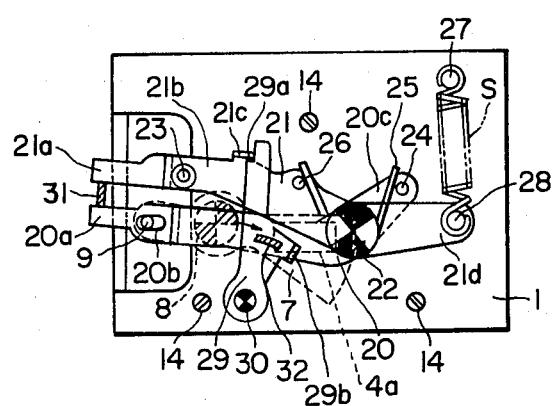
FIG. 6 is a bottom view of the mirror box mechanism of FIG. 2 during the photographing operation.

The cooperation of the light intercepting member 7 with the mirror operation will be described with reference to FIGS. 5 and 6. In the state shown in FIG. 5, the mirror operation is not effected yet. When the roller 23 on the mirror restoring lever 21 is charged by the mirror charging member (not shown) to lock the bent portion 21c with the step 29a of the locking lever 29, the mirror lifting spring 25 and the mirror restoring spring S are charged. (The mirror restoring lever 21 is set as indicated by the two-dot chain line 50.) When, under this condition, the mirror operating lever 31 is released by a release member (not shown), the lever 31 is turned through the end portion 20a of the mirror up lever 20 by the clockwise torque of the mirror lifting spring 25, to lift the mirrors (not shown in FIG. 5) as shown in FIG. 6. On the other hand, the light intercepting member 7 is coupled through the pin 9 to the elongated hole 20b of the mirror up lever 20. Therefore, before the mirrors are operated, i.e. when the automatic focus detecting device is in operation, the light intercepting member 7 opens the opening 4a of the sensor cover 4 as shown in FIG. 5. When the mirrors have been lifted, i.e. when the automatic focus detecting device is not in operation, the light intercepting member 7 turns clockwise about the shaft on the sensor cover 4 in association with the mirror up lever 20, to close the opening 4a of the sensor cover 4 as shown in FIG. 6.

Under the condition shown in FIG. 6, the locking lever 29 is turned clockwise by the shutter bottom curtain cooperating member 32, to disengage the step 29a from the bent portion 21c of the mirror restoring lever 21. As a result, the mirror restoring lever 21 is turned counterclockwise by the counterclockwise torque of the mirror restoring spring S, and accordingly the mirror operating lever 31 is turned by the end portion 21a of the mirror restoring lever 21 while the mirror up lever 20, being on the mirror operating lever 31, is turned counterclockwise. Thus, the state shown in FIG. 5 is obtained again and the mirrors are returned to the original positions. The position of the light intercepting member 7 is also returned from that in FIG. 6 to that in FIG. 5 in association with the mirror up lever 20.

As shown in FIG. 2, a soft member 5 of felt or the like is bonded to the surface of the sensor protecting glass plate 12 of the light intercepting member 7. The soft member 5 slightly rubs the sensor protecting glass plate 12 in association with the vertical movement of the mirrors, to remove dust or the like from the surface of the glass plate 12.

Figure 3:
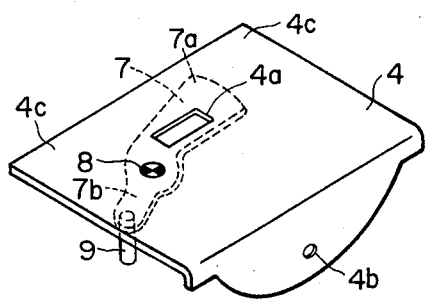
FIG. 3 is a perspective view of a sensor cover according to the present invention.

The light intercepting member 7 is rotatably mounted on the shaft 8 on the lower surface of the sensor cover 4 as shown in FIG. 3. Therefore, the sensor cover 4 can be readily removed through the opening of the mount 10 as follows: The two end portions 4c of the sensor cover 4 are disengaged from the groove 1b of the mirror box body 1 by pulling the sensor cover 4 forwards after the screw 6 has been removed through the opening of the mount 10, and therefore the sensor cover 4 can be readily removed through the opening of the mount by disengaging the pin 9 on the light intercepting member 7 from the elongated hole 20b of the mirror up lever 20. After the sensor cover 4 has been removed, the focus control of the image sensor 11 can be readily achieved by turning a screw driver inserted in the grooves of the three adjusting screws 14 on the sensor substrate 13 through the mount's opening. Therefore, the focus matching of the finder system focusing screen 16 and the focus detection system image sensor 11 can be achieved after the camera has been assembled. Furthermore, it is obvious that if a controlling variable resistor, etc. of an electronic circuit for the automatic focus detecting device are arranged on the sensor substrate 13, then the electronic circuit can be readily adjusted with the sensor cover removed even after the camera has been assembled.

As is apparent from the above description, the cover mounting structure of the present invention provides a significant practical advantage, and is simple in construction and can therefore be provided at a low manufacturing cost.

What is claimed is:

1. A single-lens reflex camera of the type having an automatic focus detecting device including an automatic focus detecting element, the improvement comprising:
   a cover member disposed over said focus detecting element and having an opening therein for limiting light incident to said automatic focus detecting element; and
   a light intercepting member for covering said opening during a photographing operation, wherein said light intercepting member includes a confronting surface which faces the upper surface of said automatic focus detecting element when said opening is covered by said light intercepting member, and cleaning means on said confronting surface for contacting said upper surface of said automatic focus detecting element during movement of said light intercepting member to clean said upper surface of said automatic focus detecting element.

2. The camera as claimed in claim 1, wherein said camera includes a mirror movable between a downward position for viewing and an upward position for a photographing operation and mirror driving means for moving said mirror upwardly and downwardly, the improvement further comprising:
   control means coupled to said mirror driving means for moving said light intercepting member to uncover said opening when said mirror is moved downwardly and for moving said light intercepting member to cover said opening when said mirror is moved upwardly.

3. The camera as claimed in claim 1, wherein said cleaning means comprises a soft member of felt or the like.

4. The camera as claimed in claim 1 or 2, wherein said camera includes a camera body having an aperture therein and a body mount surrounding said aperture for mounting an interchangeable lens to said camera body, the improvement further characterized in that said cover member is removable through said aperture.

5. The camera as defined in claim 4, wherein said automatic focus detecting element is mounted on a substrate, the improvement further comprising means disposed beneath said cover for adjustably and elastically supporting said substrate within said camera, whereby adjustment of the position of said automatic focus detecting element to achieve focus adjustment can be achieved through said aperture after removal of said cover.

6. A single-lens reflex camera of the type having an automatic focus detecting device including an automatic focus detecting element, said camera including a camera body having an aperture therein and a body mount surrounding said aperture for mounting an interchangeable lens to said camera body, said automatic focus detecting element being mounted on a substrate within said camera body, the improvement comprising:
   a cover member disposed over said focus detecting element and having an opening therein for limiting light incident to said automatic focus detecting element, said cover member being removable through said aperture;
   means disposed beneath said cover member for adjustably and elastically supporting said substrate within said camera, whereby adjustment of the position of said automatic focus detecting element to achieve focus adjustment can be achieved through said aperture after removal of said cover; and
   a light intercepting member for covering said opening during a photographing operation.

7. A single-lens reflex camera of the type having an automatic focus detecting device including an automatic focus detecting element, said camera including a camera body having an aperture therein and a body mount surrounding said aperture for mounting an interchangeable lens to said camera body, the improvement comprising:
   a cover member disposed over said focus detecting element and having an opening therein for limiting light incident to said automatic focus detecting element;
   fastening means for fastening said cover member to said camera body, said fastening means being accessible through said aperture and said cover member being small enough to fit through said aperture whereby said cover member is removable through said aperture; and
   a light intercepting member for covering said opening during a photographing operation.

8. In a camera of the type having an optical system for passing light received from an object to an image pick-up surface along an optical path, an automatic focus detecting device comprising:
   an optical member for diverting at least a portion of said light from said optical path;
   a focus detecting element for receiving said diverted light from said optical element; and
   adjustable support means for adjustably supporting said focus detecting element, whereby said focus detecting element can be positioned at a position optically equivalent to that of said image pick-up surface.

9. An automatic focus detecting device as claimed in claim 8, wherein said adjustable support means comprises a substrate for supporting said focus detecting element, and a plurality of mounting screws for adjusting the position of said substrate.

10. An automatic focus detecting device as claimed in claim 9, wherein each of said mounting screws includes a retaining portion, said adjustable support means further comprising spring means for urging said substrate against said retaining portions.

11. An automatic focus detecting device as claimed in claim 9, wherein each of said plurality of mounting screws includes at either end thereof a recess for engagement by an adjustment tool.

12. An automatic focus detecting device as claimed in claim 9, wherein said camera is of the interchangeable lens type having a lens mount opening therein, and wherein said plurality of mounting screws are accessible for adjustment through said lens mount opening from the exterior of said camera.

* * * * *